US011475719B1

(12) United States Patent
Jensen et al.

(10) Patent No.: US 11,475,719 B1
(45) Date of Patent: *Oct. 18, 2022

(54) AUTOMATED FLIGHT OPERATIONS SYSTEM

(71) Applicant: SATCOM DIRECT, INC., Melbourne, FL (US)

(72) Inventors: James Jensen, Satellite Beach, FL (US); Jason Natwick, Melbourne, FL (US); Greg Romano, Melbourne Beach, FL (US); Brian Rudloff, Satellite Beach, FL (US); David Greenhill, Indian Harbour Beach, FL (US); Derek Donahue, Satellite Beach, FL (US); Christopher Moore, Wimbledon (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/100,549

(22) Filed: Aug. 10, 2018

Related U.S. Application Data (63) Continuation of application No. 15/373,502, filed on Dec. 9, 2016, now Pat. No. 10,049,508, which is a
(Continued)

(51) Int. Cl.
 *B64F 5/40* (2017.01)
 *G07C 5/00* (2006.01)
 (Continued)

(52) U.S. Cl.
 CPC ............. *G07C 5/008* (2013.01); *G06N 5/025* (2013.01); *G06Q 10/06* (2013.01); *G08G 5/0013* (2013.01);
(Continued)

(58) Field of Classification Search
 CPC .... G07C 5/008; G07C 5/0808; G07C 5/0841; G06N 5/025; G06Q 10/06; G06Q 10/1093;
(Continued)

(56) References Cited

U.S. PATENT DOCUMENTS

| 4,037,905 A | 7/1977 | Lucas |
| 5,493,309 A | 2/1996 | Bjornholt |

(Continued)

FOREIGN PATENT DOCUMENTS

| WO | 2007/134498 A1 | 11/2007 |
| WO | 2008/139062 A1 | 11/2008 |
| WO | 2009/097042 A1 | 8/2009 |

OTHER PUBLICATIONS

Marpe, et al., A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Hien L Duong
(74) *Attorney, Agent, or Firm* — Lowndes; Stephen C. Thomas (57) ABSTRACT

Systems and methods for integrating data related to aircraft operations such as data from flight logs, flight tracker, maintenance, connectivity, router into modules, for a specific aircraft that can be communicated to and displayed on a single device display in real-time. Systems and methods for integrating data related to aircraft operations into modules, that is both aircraft-specific (engine data, take-off and landing times) and personnel specific (i.e. crew scheduling, passenger manifestos), that includes a web-based interface which incorporates multiple data fields, and can display and communicate on devices, including but not limited to desktop computers, portable devices, such as smart phones, tablets and laptops.

19 Claims, 10 Drawing Sheets

Related U.S. Application Data continuation-in-part of application No. 14/633,988, filed on Feb. 27, 2015, now Pat. No. 9,607,445.

(60) Provisional application No. 62/265,640, filed on Dec. 10, 2015, provisional application No. 61/945,526, filed on Feb. 27, 2014.

(51) Int. Cl.

| | | |
|---|---|---|
| *G08G 5/00* | (2006.01) | |
| *G06N 5/02* | (2006.01) | |
| *G06Q 10/06* | (2012.01) | |
| G07C 5/08 | (2006.01) | |
| G06Q 10/00 | (2012.01) | |
| B64F 5/60 | (2017.01) | |
| G06Q 10/10 | (2012.01) | |

(52) U.S. Cl.
CPC . *B64F 5/40* (2017.01); *B64F 5/60* (2017.01); *G06Q 10/1093* (2013.01); *G06Q 10/20* (2013.01); *G07C 5/0808* (2013.01); *G07C 5/0841* (2013.01)

(58) Field of Classification Search
CPC ........ G06Q 10/20; G08G 5/0013; B64F 5/40; B64F 5/60
See application file for complete search history.

(56) References Cited

U.S. PATENT DOCUMENTS

| | | |
|---|---|---|
| 5,937,349 A | 8/1999 | Andresen |
| 5,959,560 A | 9/1999 | Said et al. |
| 6,014,606 A | 1/2000 | Tu |
| 6,151,497 A | 11/2000 | Yee et al. |
| 6,173,159 B1 | 1/2001 | Wright et al. |
| 6,201,797 B1 | 3/2001 | Leuca et al. |
| 6,400,945 B1 | 6/2002 | Jensen et al. |
| 6,529,820 B2 | 3/2003 | Tomescu |
| 6,732,027 B2 | 5/2004 | Betters et al. |
| 6,741,841 B1 | 5/2004 | Mitchell |
| 6,781,968 B1 | 8/2004 | Colella et al. |
| 6,892,069 B1 | 5/2005 | Flynn |
| 6,954,794 B2 | 10/2005 | Rudd et al. |
| 6,970,704 B2 | 11/2005 | Jensen et al. |
| 6,978,128 B1 | 12/2005 | Raman et al. |
| 7,023,365 B1 | 4/2006 | Mitchell et al. |
| 7,027,898 B1 | 4/2006 | Leger et al. |
| 7,177,939 B2 | 2/2007 | Nelson et al. |
| 7,209,978 B2 | 4/2007 | Thubert et al. |
| 7,225,981 B2 | 6/2007 | Jongebloed |
| 7,436,762 B2 | 10/2008 | Oka et al. |
| 7,477,145 B2 | 1/2009 | Tatton et al. |
| 7,577,501 B2 | 8/2009 | Tafs et al. |
| 7,660,579 B2 | 2/2010 | Jensen |
| 7,668,632 B2 | 2/2010 | Vian et al. |
| 7,739,167 B2 | 6/2010 | Breen et al. |
| 7,761,793 B1 | 7/2010 | Mitchell |
| 7,852,819 B2 | 12/2010 | Gil et al. |
| 7,908,077 B2 | 3/2011 | Smith et al. |
| 8,305,936 B2 | 11/2012 | Wang |
| 8,335,601 B2 | 12/2012 | Sham et al. |
| 8,339,991 B2 | 12/2012 | Biswas et al. |
| 8,369,812 B2 | 2/2013 | Lehman |
| 8,432,808 B1 | 4/2013 | Dankberg et al. |
| 8,452,475 B1 | 5/2013 | West et al. |
| 8,477,771 B2 | 7/2013 | Biswas et al. |
| 8,527,662 B2 | 9/2013 | Biswas et al. |
| 8,594,931 B2 | 9/2013 | Sterkel et al. |
| 8,599,044 B2 | 12/2013 | Maggiore et al. |
| 8,712,634 B2 | 4/2014 | Followell et al. |
| 8,762,047 B2 | 6/2014 | Sterkel et al. |
| 9,008,868 B1 | 4/2015 | Bantoft et al. |
| 9,087,419 B2 | 7/2015 | Lentz |
| 9,318,024 B1 | 4/2016 | Natwick et al. |
| 2002/0111720 A1 | 8/2002 | Holst et al. |
| 2002/0123915 A1 | 9/2002 | Denning et al. |
| 2003/0055975 A1 | 3/2003 | Nelson et al. |
| 2003/0085818 A1 | 5/2003 | Renton et al. |
| 2003/0093187 A1 | 5/2003 | Walker |
| 2003/0098773 A1* | 5/2003 | Chakravarty ........ G08G 5/0013 340/3.1 |
| 2003/0123481 A1 | 7/2003 | Neale et al. |
| 2003/0225492 A1 | 12/2003 | Cope et al. |
| 2004/0064588 A1 | 4/2004 | Jungck |
| 2005/0041859 A1 | 2/2005 | Nguyen et al. |
| 2005/0053026 A1 | 3/2005 | Mullan et al. |
| 2005/0083358 A1 | 4/2005 | Lapstun et al. |
| 2005/0177647 A1 | 8/2005 | Swaminathan et al. |
| 2005/0187677 A1 | 8/2005 | Walker |
| 2005/0215238 A1 | 9/2005 | Macaluso |
| 2005/0215249 A1 | 9/2005 | Little et al. |
| 2005/0216139 A1 | 9/2005 | Laughlin et al. |
| 2005/0220055 A1 | 10/2005 | Nelson et al. |
| 2005/0244060 A1 | 11/2005 | Nagarajan et al. |
| 2006/0013264 A1 | 1/2006 | Eichler et al. |
| 2006/0092897 A1 | 5/2006 | Pirila et al. |
| 2006/0115164 A1 | 6/2006 | Cooley |
| 2006/0156357 A1 | 7/2006 | Lockridge et al. |
| 2006/0293049 A1 | 12/2006 | Jensen |
| 2007/0123290 A1 | 5/2007 | Stenmark |
| 2008/0010005 A1* | 1/2008 | Small .................. G08G 5/00 701/120 |
| 2008/0010107 A1* | 1/2008 | Small .................... G06Q 10/06 705/1.1 |
| 2008/0046167 A1* | 2/2008 | Small .................... G06Q 10/00 701/120 |
| 2008/0159158 A1 | 7/2008 | Poisson et al. |
| 2008/0163093 A1* | 7/2008 | Lorido ................ G08G 5/0021 715/771 |
| 2008/0182573 A1 | 7/2008 | Lauer et al. |
| 2009/0023403 A1 | 1/2009 | LaBerge |
| 2009/0109849 A1 | 4/2009 | Wood et al. |
| 2009/0239475 A1 | 8/2009 | Lehman |
| 2009/0304096 A1 | 12/2009 | Khattab et al. |
| 2010/0027461 A1 | 2/2010 | Bothorel |
| 2010/0035607 A1 | 2/2010 | Horr et al. |
| 2010/0042445 A1* | 2/2010 | Nicosia ................ G06Q 50/30 705/7.15 |
| 2010/0167723 A1 | 7/2010 | Soumier et al. |
| 2010/0217458 A1 | 8/2010 | Schweiger et al. |
| 2010/0279698 A1 | 11/2010 | Wong |
| 2011/0046842 A1 | 2/2011 | Smith |
| 2011/0046920 A1 | 2/2011 | Amis |
| 2011/0063980 A1 | 3/2011 | Kondo |
| 2011/0114726 A1 | 5/2011 | Porter et al. |
| 2011/0149849 A1 | 6/2011 | Brownrig |
| 2011/0255506 A1 | 10/2011 | Toth et al. |
| 2011/0313614 A1 | 12/2011 | Hinnant et al. |
| 2012/0033851 A1 | 2/2012 | Chen et al. |
| 2012/0083971 A1 | 4/2012 | Preston |
| 2012/0109447 A1 | 5/2012 | Yousefi et al. |
| 2012/0166576 A1 | 6/2012 | Orsini et al. |
| 2012/0232782 A1 | 9/2012 | Sterkel et al. |
| 2012/0303826 A1 | 11/2012 | Nelsen et al. |
| 2013/0103786 A1 | 4/2013 | Miglore et al. |
| 2013/0120166 A1 | 5/2013 | Kommuri et al. |
| 2013/0158821 A1 | 6/2013 | Ricci |
| 2013/0219429 A1 | 8/2013 | Hirsch et al. |
| 2013/0235728 A1 | 9/2013 | Le et al. |
| 2013/0283305 A1 | 10/2013 | Hirsch et al. |
| 2013/0297103 A1 | 11/2013 | Baker et al. |
| 2014/0024395 A1 | 1/2014 | Johnson et al. |
| 2014/0045420 A1 | 2/2014 | Tong et al. |
| 2014/0045520 A1 | 2/2014 | Lim et al. |
| 2014/0053243 A1* | 2/2014 | Walsh .................... H04L 67/12 726/4 |
| 2014/0081483 A1 | 3/2014 | Weinmann et al. |
| 2014/0137162 A1 | 5/2014 | McNamee et al. |
| 2014/0248588 A1 | 9/2014 | Williams et al. |
| 2014/0282038 A1 | 9/2014 | Royster et al. |
| 2014/0315166 A1 | 11/2014 | Williams et al. |

(56) References Cited

U.S. PATENT DOCUMENTS

2014/0368356 A1* 12/2014 Samuthirapandian ........................
                                                        G08G 5/0004
                                                           340/901
2015/0007080 A1*  1/2015 Nama .................. G08G 5/0021
                                                           715/771
2015/0243112 A1   8/2015 Jensen et al.

OTHER PUBLICATIONS

Linux man page, gzip, gunzip, zcat-compress or expand files, 2002, 7 pages.
Rockwell Collins, EBACE 2012 Press Kit, retrieved on Oct. 4, 2013, retrieved from http://www.rockwellcollins.com/sitecore/content/Data/News/2012_2012_Tr/CS- /FY12CSN . . . , 2 pages.
Vandel, et al., Head-Up Guidance System Technology—A Clear Path to Increasing Flight Safety, Flight Safety Foundation, 2009, 29 pages.
Rockwell Collins, Ascent Mobile Applications, 2012, 2 pages.
Rockwell Collins, Falcon Cabin HD, Elevate your flight experience, 2012, 12 pages.
Rockwell Collins, Rockwell Collins to provide advanced cabin management and HD entertainment system for Falcon 7x and Falcon 900LX, News Release, 2012, 1 page.
Rockwell Collins, Jet Aviation St Louis ti install Rockwell Collins' Venue HD cabin system on a Global Express, News Release, 2012, 2 pages.
Rockwell Collins, Airshow 4000, retrieved on Oct. 4, 2013, retrieved from http://www.rockwellcollins.com/sitecore/content/Data/Products/Cabin/Movin- g_Map_syst . . . , 2 pages.
Rockwell Collins, Airshow App for Mobile Devices, 2012 4 pages.
Rockwell Collins, Airshow 4000 Version 2, 2013, 9 pages.

* cited by examiner

FIG. 6 https://sdpro.satcomdirect.com/SDR/Drilldown?id=12345

Navigation
Dashboard
SDR
Flight Logs

N321SD
N651SD
N990MM

SDR
SATCOM DIRECT ROUTER

◎ Disconnected

Currently Connected:
True

Global One IP:
10.202.2.1

Most Recent Check-in:
10:10:2015 14:12:10 UTC

Installed Firmware Version:
1.3.0-r2641

Install Date:
3/5/2015

New Firmware Available:
1.3.4-r1781

N321SD  IN FLIGHT

Devices Connected:
7

Updated:
25-Aug-2015 20-22UTC

| | | |
|---|---|---|
| 68.95.179.17 | Jim's-tablet | C4:48:38:00:00:00 |
| 68.95.179.12 | Brian's-iphone | C4:48:38:00:00:00 |
| 68.95.179.32 | Jason-ipad | C4:48:38:00:00:00 |
| 68.95.179.14 | Greg's-phone | C4:48:38:00:00:00 |
| 68.95.179.17 | Eric's-tablet | C4:48:38:00:00:00 |
| 68.95.179.17 | Alex's-tablet | C4:48:38:00:00:00 |
| 68.95.179.17 | Leila's-phone | C4:48:38:00:00:00 |

FIG. 7

AUTOMATED FLIGHT OPERATIONS SYSTEM

CROSS REFERENCE TO RELATED APPLICATIONS

This application is a continuation of U.S. patent application Ser. No. 15/373,502, filed Dec. 9, 2016, now U.S. Pat. No. 10,049,508, which claims the benefit of priority to U.S. Provisional Patent Application No. 62/265,640 filed Dec. 10, 2015 and is a Continuation-In-Part of U.S. patent application Ser. No. 14/633,988, filed Feb. 27, 2015, now U.S. Pat. No. 9,607,445, which claims the benefit of priority to U.S. Provisional Patent Appln. No. 61/945,526 filed Feb. 27, 2014. The entire disclosure of each of the applications listed in this paragraph are incorporated herein by specific reference thereto.

FIELD OF INVENTION

This invention relates to flight systems, and in particular to systems and methods for integrating data related to a plurality of modules of aircraft operations such as data from flight logs, flight scheduling, flight tracker, maintenance, connectivity, router into modules, for a specific aircraft that can be communicated to and displayed on a single device display in real-time.

BACKGROUND AND PRIOR ART

Information required for aircraft operations can be aircraft specific, flight specific, personnel specific, specific to time and place, specific to regulatory requirements, or a combination thereof. Aircraft specific data includes but not limited to engine data, the time an aircraft is dispatched, take-off data, landing times, the time an aircraft is secured following flight, landing gear cycles, control inputs, which data come from a wide variety of sources, not all of which are readily all available at the same time in real-time.

Personnel specific data can include but is not limited to crew scheduling, passenger manifestos, etc. is also necessary for aircraft operations but is not readily available at the same time in real-time.

Similarly, necessary data for aircraft operations can include regulatory information concerning airspace and airports, weather information, air traffic control information, some of which can change during aircraft operations as a result of actions taken by persons on the aircraft, off the aircraft, or by forces of nature, and which data are not readily all available at the same time in real-time.

None of the prior art allows for saving information into different computerized information modules such as data from flight logs, flight tracker, maintenance, connectivity, router into modules, for a specific aircraft that can be communicated to and displayed on a single device in real-time. In many instances in the field of aircraft operations, there is no integration of this data. Some operators, for example, keep maintenance information concerning their operations in one place, personnel information in another, aircraft asset information in another, flight planning information elsewhere, and so on, despite the numerous areas where deriving useful solutions for any of the myriad flight-related activities for safe and orderly conduct of aircraft operations might require the same data for different uses.

The prior art has several different systems from different venders that would store data in different locations. There are different user credentials and user interfaces and the data is not shared across disparate systems.

The novel invention combines these systems in a single user interface and with a common data store that allows them to share information between modules.

Further compounding the problem, when aircraft operations are conducted for lengthy periods away from a home base, such as when a corporate aircraft is used to make a weeks' long trip, the collection of data concerning those operations lags the usage, as systems and personnel do not currently communicate with one another all the information described above concerning aircraft operations in real time.

Thus, the need exists for solutions to the above problems with the prior art. By creating a single seamless integrated real-time flight data management solution, aircraft operations will be made more orderly and efficient, as all required information is collected and displayed in real time, and then tailored to meet the specific need to be addressed, such as flight planning, trip scheduling, aircraft maintenance, or as the case may be.

SUMMARY OF THE INVENTION

A primary objective of the present invention is to provide systems and methods for integrating data related to aircraft operations such as data from flight logs, flight scheduling, flight tracker, maintenance monitoring and reporting systems, network connectivity systems, and data routers into user-friendly intuitively related modules for a specific aircraft that can be communicated to and displayed on a single device in real-time.

A secondary objective of the present invention is to provide systems and methods for integrating data related to aircraft operations into modules, that is both aircraft-specific (e.g., engine data, take-off and landing times) and personnel specific (e.g., crew scheduling, passenger manifestos), that includes a web-based interface which incorporates multiple data fields, and can display and communicate on devices, including but not limited to portable devices, such as smart phones, tablets and laptops.

A third objective of the present invention is to provide systems and methods for providing flight departments with all information necessary to manage an aircraft in real time that is web-based on a single adaptive user interface, such as a single display devices including smart phones, tablets and laptops.

A fourth objective of the present invention is to provide a single seamless integrated real-time flight data management solution where aircraft operations are made more orderly and efficient, so that all required information is collected and displayed in real time, and then tailored to meet the specific need to be addressed, such as flight planning, trip scheduling, aircraft maintenance, non-aviation regulatory categorization (such as for tax planning or reporting, e.g.) and the like.

A system for integrating data related to aircraft operations of an aircraft on a single display, can include a flight log module for recording the flight log data of the aircraft, a flight scheduling module for viewing and establishing the flight schedule of the aircraft, a flight tracker module for recording flight tracker data of the aircraft, a maintenance module for recording maintenance data of the aircraft, a connectivity module for recording connectivity data for the aircraft, and a router module for recording data from different systems between devices onboard the aircraft and the ground, wherein all data from the flight log module, the flight tracker, the maintenance module, the connectivity module and the router module are displayed on a single display device in real-time.

The flight log data can include take off and landing time data of the aircraft. The flight tracker data can include location data of the aircraft in real time. The maintenance data can include maintenance records of the aircraft. The connectivity data can include useage data of devices on the aircraft in real time.

The system can include a web service for connecting data to the modules. The single display device can be selected from one of at least a desktop computer, a smart phone, and a portable computer.

A method for integrating data related to aircraft operations of an aircraft on a single display, can include the steps of providing a flight log module for recording the light log data of the aircraft, providing a flight scheduling module for viewing and establishing the flight schedule of the aircraft, providing a flight tracker module for recording flight tracker data of the aircraft, providing a maintenance module for recording maintenance data of the aircraft, providing a connectivity module for recording connectivity data for the aircraft and displaying all data from the flight log module, the flight tracker, the maintenance module and the connectivity module on a single display in real-time.

The flight log data can include take off and landing time data of the aircraft. The flight tracker data can include location data of the aircraft in real time. The maintenance data can include maintenance records of the aircraft. The connectivity data can include useage data of devices on the aircraft in real time.

The method can include the step of providing a web service for connecting data to the modules. The displaying step can include the step of displaying data from the modules on the single display device selected from one of at least a smart phone, a tablet and a laptop computer.

A method of accessing flight operations of a single aircraft, can include the steps of providing a single interface to access a web portal, providing a plurality of modules for a single aircraft flight operations, displaying the plurality of modules of an aircraft's flight operations in real time on a single display dashboard in response to accessing the web portal and selecting an individual module from the plurality of modules so that the individual module is displayed on the single display dashboard.

The step of providing a single interface can include the step of accessing the web portal through a portable digital device selected from one of a desktop computer, a smart phone, a portable computer.

The step of providing the plurality of modules can include the steps providing a flight log module for recording flight log data of the aircraft, providing a flight scheduling module for viewing and establishing the flight schedule of the aircraft, providing a flight tracker module for recording flight tracker data of the aircraft, providing a maintenance module for recording maintenance data of the aircraft, providing a connectivity module for recording connectivity data for the aircraft, and providing a router module for recording data from different systems between devices onboard the aircraft and the ground.

An integrated flight operations management platform system can include an interface for accessing a web portal site, a plurality of modules for a single aircraft flight operations, a single display dashboard for displaying the plurality of modules of an aircraft's flight operations in real time in response to accessing the web portal, and a control for selecting an individual module from the plurality of modules so that the individual module is displayed on the single di splay dashboard.

The plurality of modules can include a flight log module for recording flight log data of the aircraft, a flight scheduling module for viewing and establishing the flight schedule of the aircraft, a flight tracker module for recording flight tracker data of the aircraft, a maintenance module for recording maintenance data of the aircraft, and a connectivity module for recording connectivity data for the aircraft; and a router module for recording data from different systems between devices onboard the aircraft and the ground, wherein all data from the flight log module, the flight tracker, the maintenance module, the connectivity module and the router module are displayed on a single display device in real-time.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Flight departments rely on information from numerous sources to manage an aircraft and aircraft operations. SD PRO® is built upon a software framework so that flight departments can be in sync with the aircraft in real-time. The invention software framework is a universal, reusable software environment that provides particular functionality as part of a larger software platform to facilitate the development of products and solutions for flight departments. The invention uses a software framework that includes support programs, tool sets, and application programming interfaces (APIs) that bring together all the different components to enable this solution. This allows SD PRO® to present data from the aircraft, flight department staff, other employees (for example, text messages, and emails and the like), and 3rd-party interfaces and inputs into a single adaptive user interface that is compatible with wide range of devices.

Flight Departments rely on information from all aspects to manage an aircraft. SD PRO® is built upon a software framework so that flight departments can be in sync with the aircraft in real-time. The invention software framework is a universal, reusable software environment that provides particular functionality as part of a larger software platform to facilitate the development of products and solutions for flight departments.

The invention software framework includes support programs, tool sets, and application programming interfaces (APIs) that bring together all the different components to enable this solution. This allows invention to present data from the aircraft, flight department staff, employees and 3rd-party interfaces into a single adaptive user interface that is compatible with wide range of devices.

The invention is a system for integrating, displaying and communicating in real-time data generated related to aircraft operations. Some of the data is aircraft-specific, like engine data, out of gate, take-off, landing and into gate (sometimes referred to in the industry as Out-Off-On-In or "OOOI") times, etc. Some is specific to personnel, such as crew scheduling, passenger manifests, etc. The system will be a web-based interface, and incorporate multiple data feeds.

This application is a continuation of U.S. patent application Ser. No. 15/373,502, filed Dec. 9, 2016, now U.S. Pat. No. 10,049,508, which claims the benefit of priority to U.S. Provisional Patent Application No. 62/265,640 filed Dec. 10, 2015 and is a Continuation-In-Part of U.S. patent application Ser. No. 14/633,988, filed Feb. 27, 2015, now U.S. Pat. No. 9,607,445, which claims the benefit of priority to U.S. Provisional Patent Appln. No. 61/945,526 filed Feb. 27, 2014. The entire disclosure of each of the applications listed in this paragraph are incorporated herein by specific reference thereto.

A list of the reference numbers in the figures will now be described.

Figure 1:
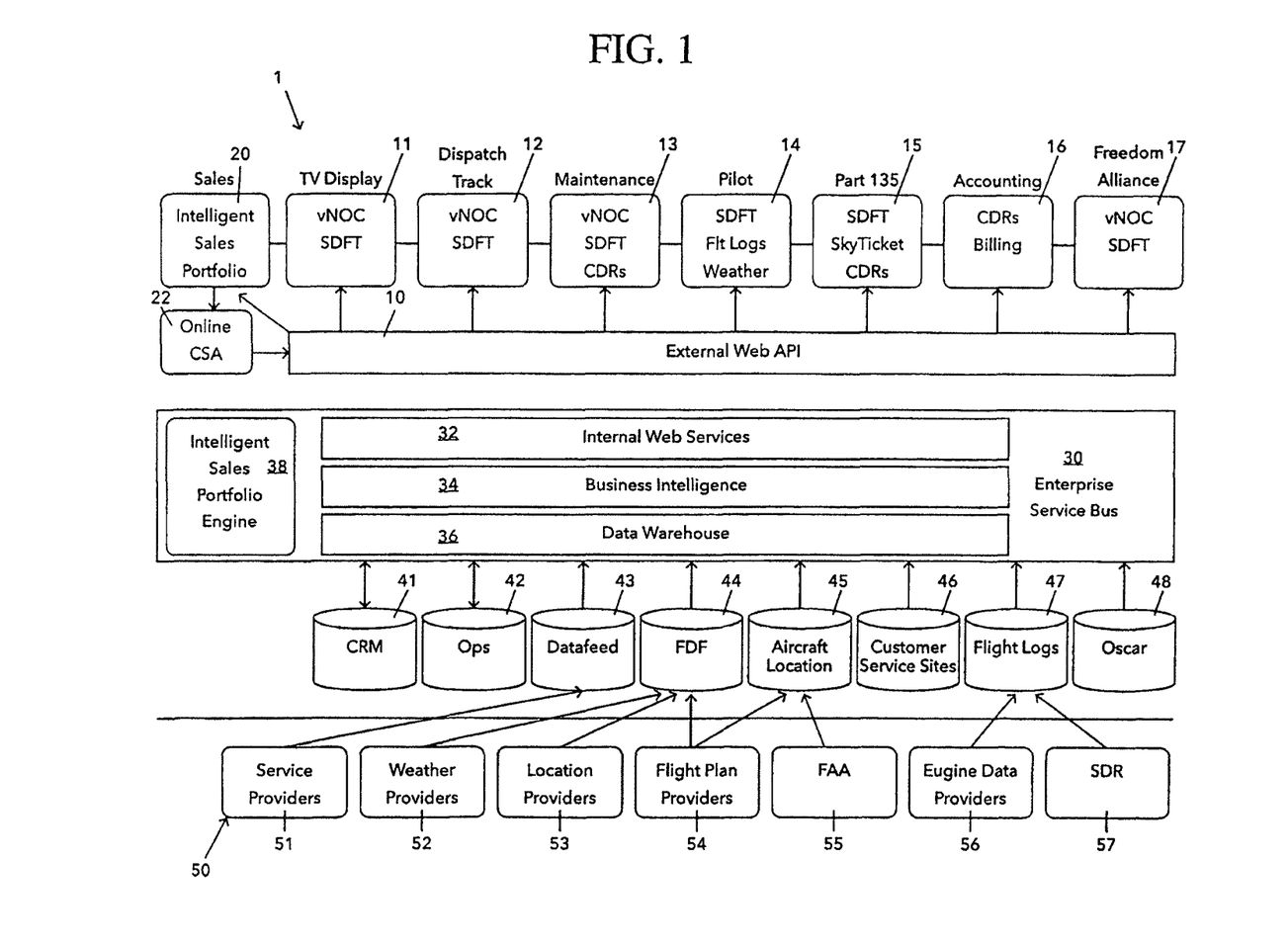
FIG. 1 is a flow chart diagram showing the providers and modules for the automated operations system of the invention.

1 Automated operations system diagram.
10 External Web API refers to (application program interface).
11 SDFT refers to (SATCOM DIRECT® Flight Tracker) for TV Display.
12 Dispatch track.
13. CDRs refers to (Call Data Records) for Maintenance (aircraft maintenance).
14. Flt logs Weather refers to flight logs weather for the pilot (aircraft pilot).
15 Federal Aviation Regulations (FARs) Part 135 (14 C.F.R. 135) applies to, among others types of aircraft, turbojet engine powered aircraft with 1-30 seats, non-transport category turbo-propeller powered aircraft with 10-19 seats, and transport category turbo props with 20-30 seats.
16. CDRs refers to (SKYTICKET® Call Data Records) for Accounting (Accounting Department Information).
17. New Apps & service refers to new SD applications and SD services.
20 Sales refers to SD Sales Department. The Intelligent Sales Portfolio determines the products and services that can be sold to customer based on their airframe.
22 Online CSA refers to SATCOM DIRECT INC.® Web-based Customer Service Agreement.
30 Enterprise Service Bus refers to an enterprise service bus (ESB) is a software architecture for middleware that provides fundamental services for more complex architectures. For example, an ESB incorporates the features required to implement a service-oriented architecture (SOA). In a general sense, an ESB can be thought of as a mechanism that manages access to applications and services to present a single, simple, and consistent interface to end-users via Web- or forms-based client-side front ends.)
32 Internal Web Services refers to a Web Service which is a software system designed to support machine-to-machine interaction over a network. It has an interface described in a machine-processable format. Other systems interact with the Web service in a manner prescribed by its description using SOA messages, typically conveyed using HTTP with an XML serialization in conjunction with other Web-related standards. Internal Web Services are hosted on an internal network.
34 Business Intelligence (BI) is a set of theories, methodologies, architectures, and technologies that transform raw data into meaningful and useful information for business purposes. BI can handle enormous amounts of unstructured data to help identify, develop and otherwise create new opportunities. BI, in simple words, makes interpreting voluminous data user-friendly.
36 Data Warehouse is a relational database that is designed for query and analysis rather than for transaction processing. It usually contains historical data derived from transaction data, but it can include data from other sources. It separates analysis workload from transaction workload and enables an organization to consolidate data from several sources.
38 Intelligent Sales Portfolio Engine are algorithms and processes used to generate the analysis necessary to determines the products and services that can be sold to customer based on their airframe.
41 CRM (Customer relationship management) is an approach to managing a company's interaction with current and future customers. It often involves using technology to organize, automate, and synchronize sales, marketing, customer service, and technical support.

42 Ops (Operation Center)—SD's custom proprietary internal application for service activation and configurations.
43 Datafeed is a network connection to a service provider that allows call data records to be transferred from the service provider to SD in a near real-time manner.
44 FDF (FLIGHTDECK FREEDOM®) is an SD product for aircraft datalink services.
45 Aircraft location are the aircraft's coordinates in latitude and longitude.
46 Customer Service Sites refers to any SD customer facing external website that can be used by the customer.
47 Flight logs are log books that are filled out by pilots that contain flight information, such as takeoff and landing times.
48 OSCAR is an SD custom accounting application that is used to invoice customers based on their products, services, and usage.
50 Providers for data are other companies or entities that provide data to SD. Usage data, weather, aircraft location data, flight plan data, aircraft maintenance data, etc.
51 Service providers are other companies that provide us satellite, UHF, and 3G network services. Examples include, INMARSAT®, Iridium, VIASAT SITA and AT&T.
52 Weather providers are companies that provide weather data, radar imagery, satellite imagery, winds aloft, and aviation-specific weather products such as Meteorological Aerodrome Reports (METARs) and Terminal Aerodrome Forecasts (TAFs).
53 Location providers refers to any entity that provide location data for aircraft. Examples are, the FAA and Inmarsat.
54 Flight Plan Providers are companies that provide services related to creating and/or filing with appropriate government agencies aircraft flight plans. Examples are, FLTPLAN.com, UNIVERSAL WEATHER, FOREFLIGHT and JEPPESEN®.
55 FAA refers to the United States Federal Aviation Administration.
56 Engine Data Providers are companies that manufacture aircraft engines. Examples are ROLLS-ROYCE®, HONEYWELL® and GE.
57 SDR refers to SATCOM DIRECT® Router.

FIG. 1 is a flow chart diagram showing the providers and modules for the automated operations system of the invention.

Satcom Direct receives data from service providers, weather providers, location providers, flight plan providers, the FAA, engine providers, and from the SDR. The real-time data is stored in several transactional databases. Background processes then join the transactional data with customer and aircraft configuration and join it with the provider data and the resulting data is transferred to a data store. This data store can now be quickly accessed by internal web services layer.

Figure 2:
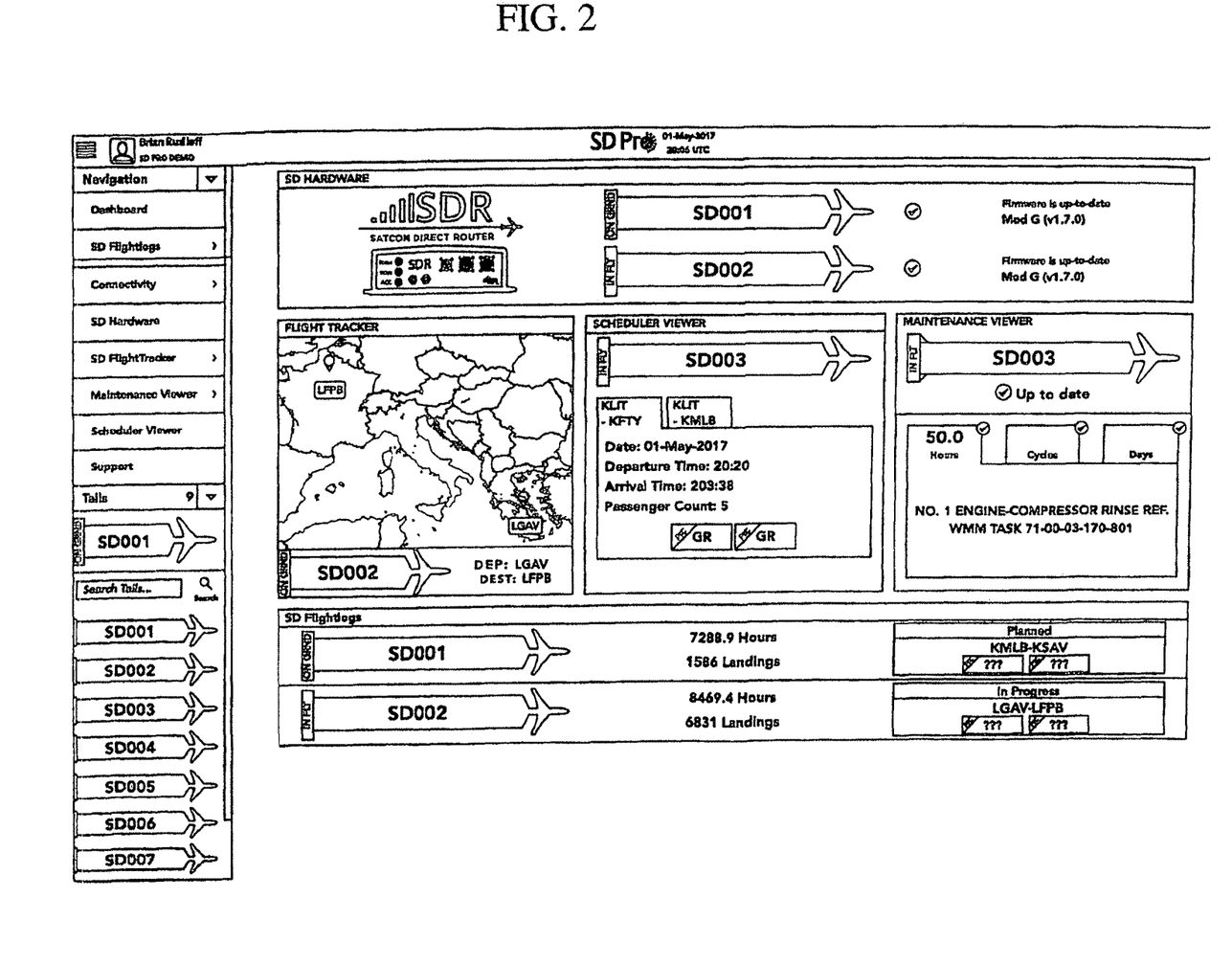
FIG. 2 is a main page screen shot of the flight operation modules displayed on a single device.

FIG. 2 is a main page screen shot of the flight operation modules displayed on a single device, which can include a flight logs module, a flight tracker module, flight schedule module, maintenance module, connectivity module and router module.

Displaying all of the modules on a single interface greatly simplifies the process of managing a flight department and unifies previously disparate systems into one.

Figure 3A:
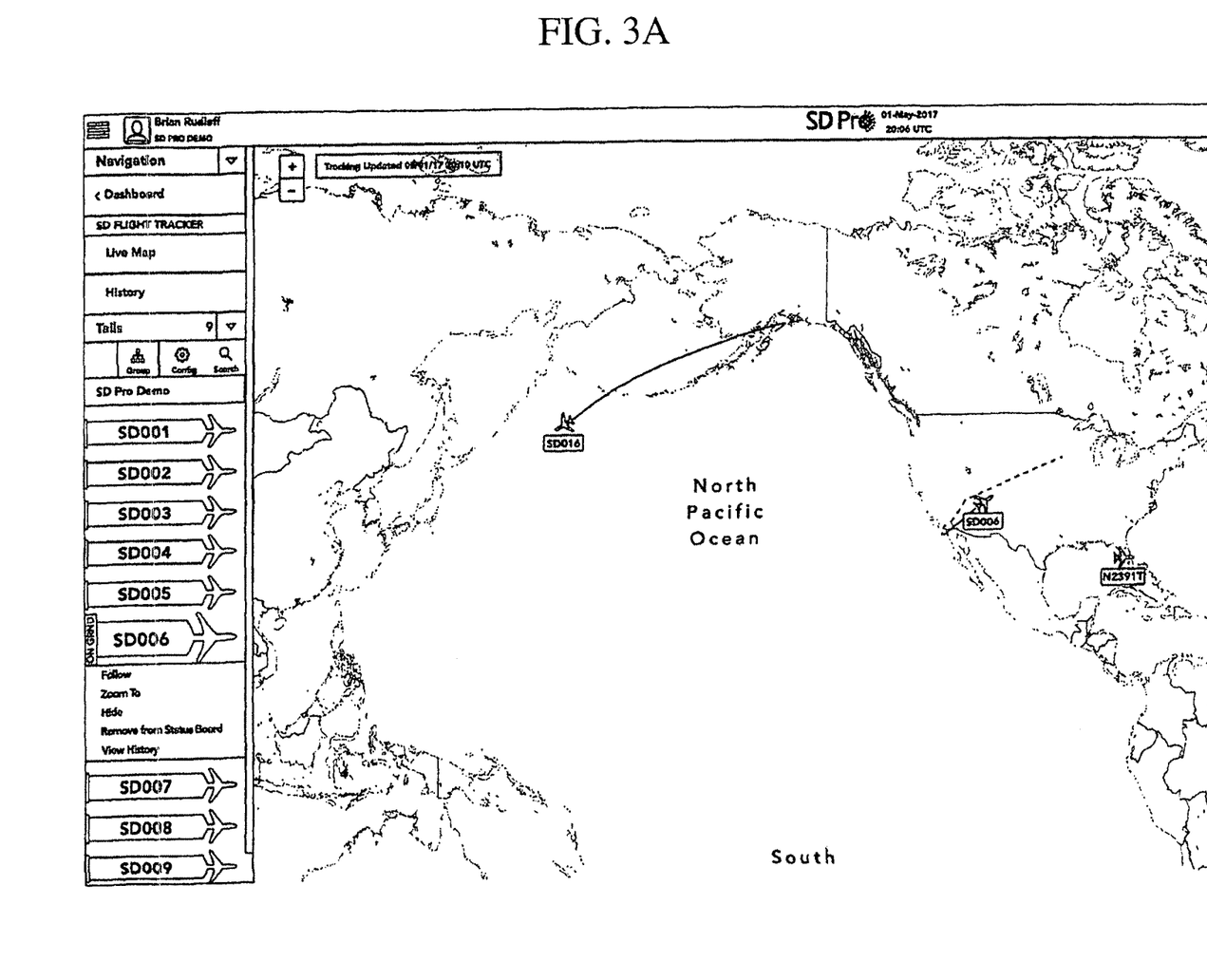
FIG. 3A is a screen shot showing flight tracker data from the flight data module.

FIG. 3A is a screen shot showing flight tracker data and maintenance module data from the flight data module.

The flight tracker is the only tracking solution today that enables multiple data position sources for the aircraft. Whether it be position data from the aircraft equipment, ground data points, or the network operators, the flight tracker module provides a single user interface to see the latest position of the aircraft. The flight tracker module also gives situational awareness to the flight operations by monitoring and alerting the user based on location, network connectivity availability, cabin usage, and much more.

Figure 3B:
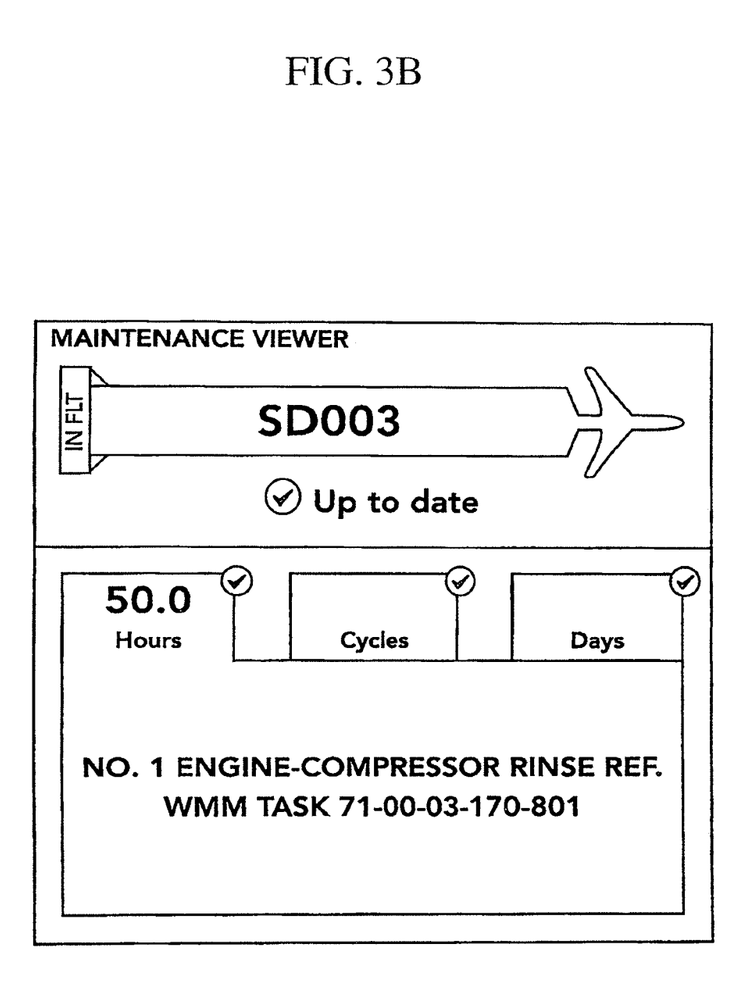
FIGS. 3B and 3C are additional screenshots of the maintenance module from FIG. 3A.
Figure 3C:
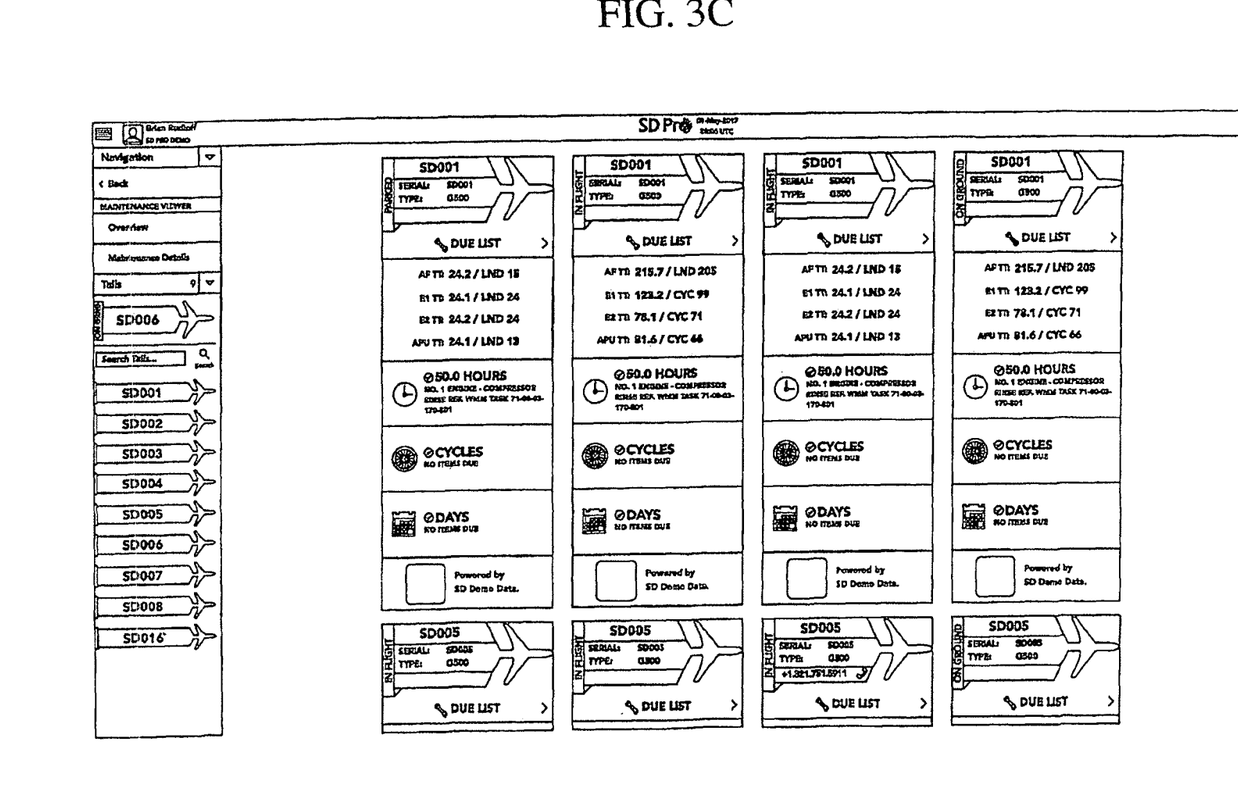

FIGS. 3B and 3C are additional screen shots of the maintenance modules.

The maintenance module is a maintenance tracking solution that goes with the aircraft. Similar to cars, maintenance tracking solutions are a tool used by flight departments to know what is coming due or what is overdue. Today, maintenance tracking programs are offered by several companies including an original equipment manufacturer (OEM) and aftermarket solutions. They typically work on a specific OEM's aircraft, but some can offer services to multiple OEMs' aircraft. Maintenance tracking programs are typically only accessed by the maintenance personnel. The novel maintenance module gives a quick insight look to the rest of the flight department to see what is coming due for the aircraft. A flight department could use many different solutions, and the novel maintenance module is the one high level view into the latest status of the aircraft.

The maintenance module does not replace the maintenance tracking solutions, it integrates with them to provide a simple view into the current maintenance status of an aircraft. Maintenance tracking providers include: GULFSTREAM® CMP and FLIGHTDOCS®.

"GULFSTREAM® CMP" is a continuous maintenance program provided by GULFSTREAM®.

"FLIGHTDOCS®" is another third-party maintenance service provider.

The FAA requires aircraft operators to maintain their aircraft in an "airworthy" condition, which means that the aircraft conform to their FAA-issued type certificate and are otherwise safe for flight. To remain in conformity with a type certificate, the aircraft must be maintained in such a way that it complies with all manufacturer's required maintenance instructions. These are myriad on sophisticated aircraft—engine manufacturers, airframe manufacturers, avionics manufacturers, etc., all publish various required maintenance processes. Some are required based on elapsed flight time (e.g., "Inspect this-and-such every 100 flights hours . . . "), some based on calendar time (e.g., "Replace the so-and-so every six months . . . "), some based on other metrics (like engine cycles, landing gear cycles . . . ), some based on events (e.g., "If the aircraft is struck by a bird, conduct the following inspections . . . "), etc. Management of all is complex. For regulated air carriers in particular, one way for the operator to satisfy the regulators is for the carrier to develop a continuous airworthiness maintenance program, by which the carrier demonstrates that it can meet or exceed all required maintenance events on a regular schedule that also suits its operations. This allows the air carrier to have predictability while still keeping up with its maintenance obligations.

For a fee, the services above will provide that service to an aircraft operator. They promise to manage the scheduled maintenance of aircraft so that nothing gets missed, and to otherwise bring efficiencies to the process so that aircraft operators enjoy more orderly and reliable aircraft availability.

Figure 4:
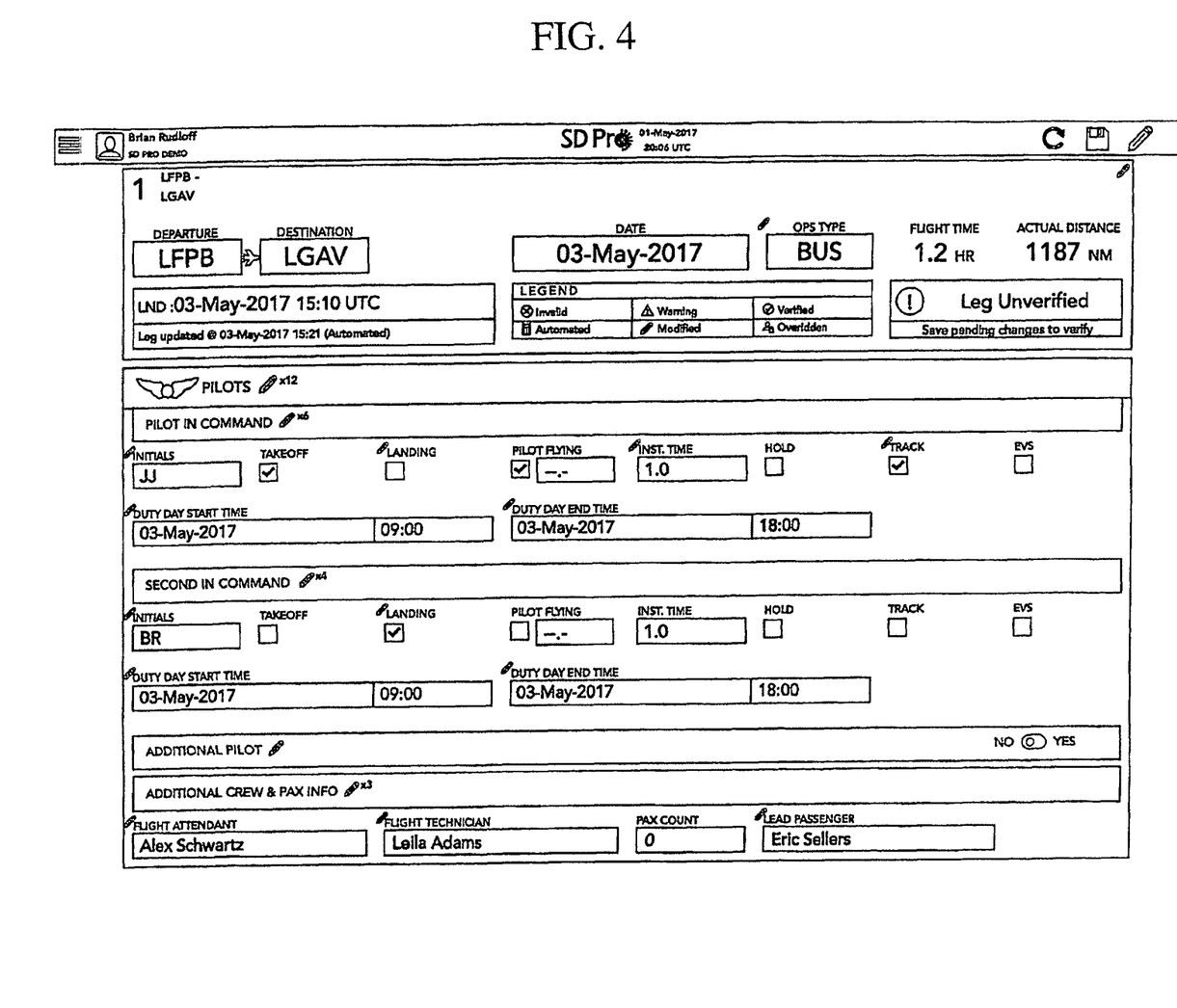
FIG. 4 is a screen shot showing flight log data from the flight log module.

FIG. 4 is a screen shot showing flight log data from the flight log module. The novel system uses an exclusive electronic flight logs solution, which is the first web-based system designed to capture and manage aircraft flight log data. Powered by SATCOM DIRECT's (ID FLIGHTDECK FREEDOM® (FDF), and the SATCOM DIRECT® Router (SDR) and the flight logs module automates the tracking of aircraft movement events. It auto captures data, calculating and recording flight time and cycle events while documenting all flight information leg by leg, reducing manual input.

The flight logs module gives every member of the flight operation real-time access to the live data, keeping them in sync with the aircraft. Team members access information from three primary menus: fleet overview, trip list and trip details, allowing them to view high-level summary data or detailed flight events for each leg of a trip. It gives the aircraft operator a smart system that provides user guidance, reduces human error, and provides real-time data. And, it's smart device compatible. Flight logs modules creates an efficient, single access point for all operational users from pilot to maintenance and scheduler, revolutionizing the way aircraft movement events are accessed and recorded.

The novel flight logs module includes a web-based application, powered by and synced with FLIGHTDECK FREEDOM® and SDR, that is smart device compatible, includes a real-time auto capture of data, includes smart phone alerts to flag when inconsistencies are present.

The Real time data captured from FDF and the SDR auto populates Flightlogs reducing manual input for the flight crew. This automation reduces the workload of the aircraft, increases the accuracy of the data, and eliminates the human factor of mathematical errors.

The flight logs module records and stores flight data for the life of the aircraft, and includes third party vendor integration with maintenance and scheduling software. The flight logs module include leg verification, process and functionality. The module includes trip verification, process and functionality. The flight logs module has been designed to meet or exceed FAA standards and is e-signature compliant.

Flight log data can be stored in SD's private data center.

The flight log module can capture information that has a FLIGHTDECK FREEDOM® datalink. Depending on avionics type, automation can be applied and occasionally, manual entry can be used. The flight logs module can alert the user of manual entries.

The user can edit data in the flight logs module. Edits can be done manually, and automatically captured. Users have the ability to update flight logs data prior to leg verification.

A web based internet connection is needed for flight logs module to receive updates and/or validate manual modifications.

The flight logs module does not require extra hardware installation is if the flight deck datalink is capable and subscribed to the FlightDeck Freedom service.

Flight log module automatically captures data from multiple sources on the aircraft and ground based solutions. The invention uses validates, calculates, and captures all data source making it available to the flight logs module.

Flight logs module usage can be billed on a per tail basis.

Figure 5A:
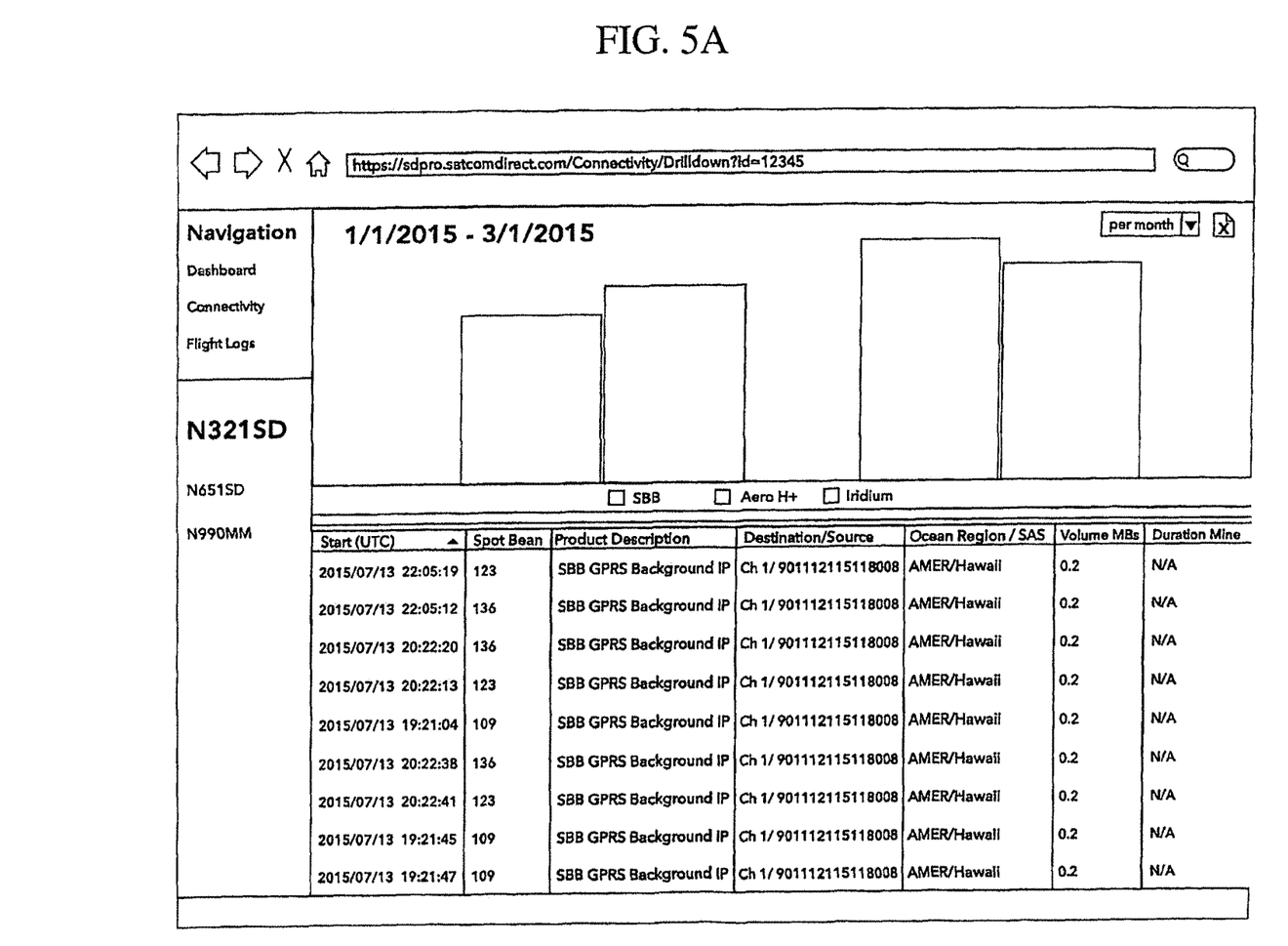
FIG. 5A is a screen shot showing connectivity data from the connectivity module.
Figure 5B:
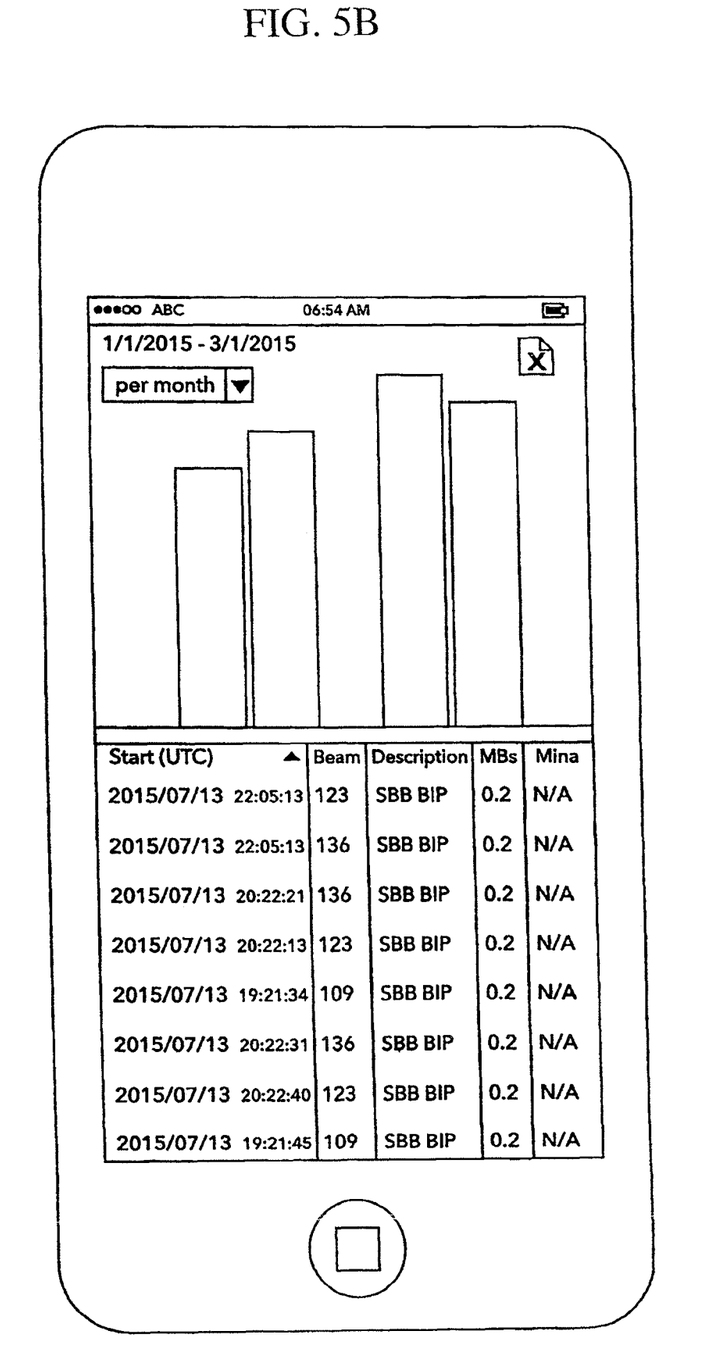
FIG. 5B is another screen shot showing the connectivity data from the connectivity module of FIG. 5A on a portable device such as a smart phone.

FIG. 5A is a screen shot showing connectivity data from the connectivity module. FIG. 5B is another screen shot showing the connectivity data from the connectivity module of FIG. 5A on a portable device such as a smart phone.

Referring to FIGS. 5A-5B, the connectivity module enables the user a rich experience to the usage detail on the aircraft in their fleet. Today's aircraft have multiple ways to connect on the aircraft for voice and data. SD Connectivity gives the user the ability to see how the traffic was used, how much was used, and when it was used. The requirement to look at each data source individually is no longer a requirement within in the Connectivity module. This module is built to look at the data a user wants to see, broken down by trip, leg, day, or month. However the user wants to see their data they have the ability to see that from one screen.

Figure 6:
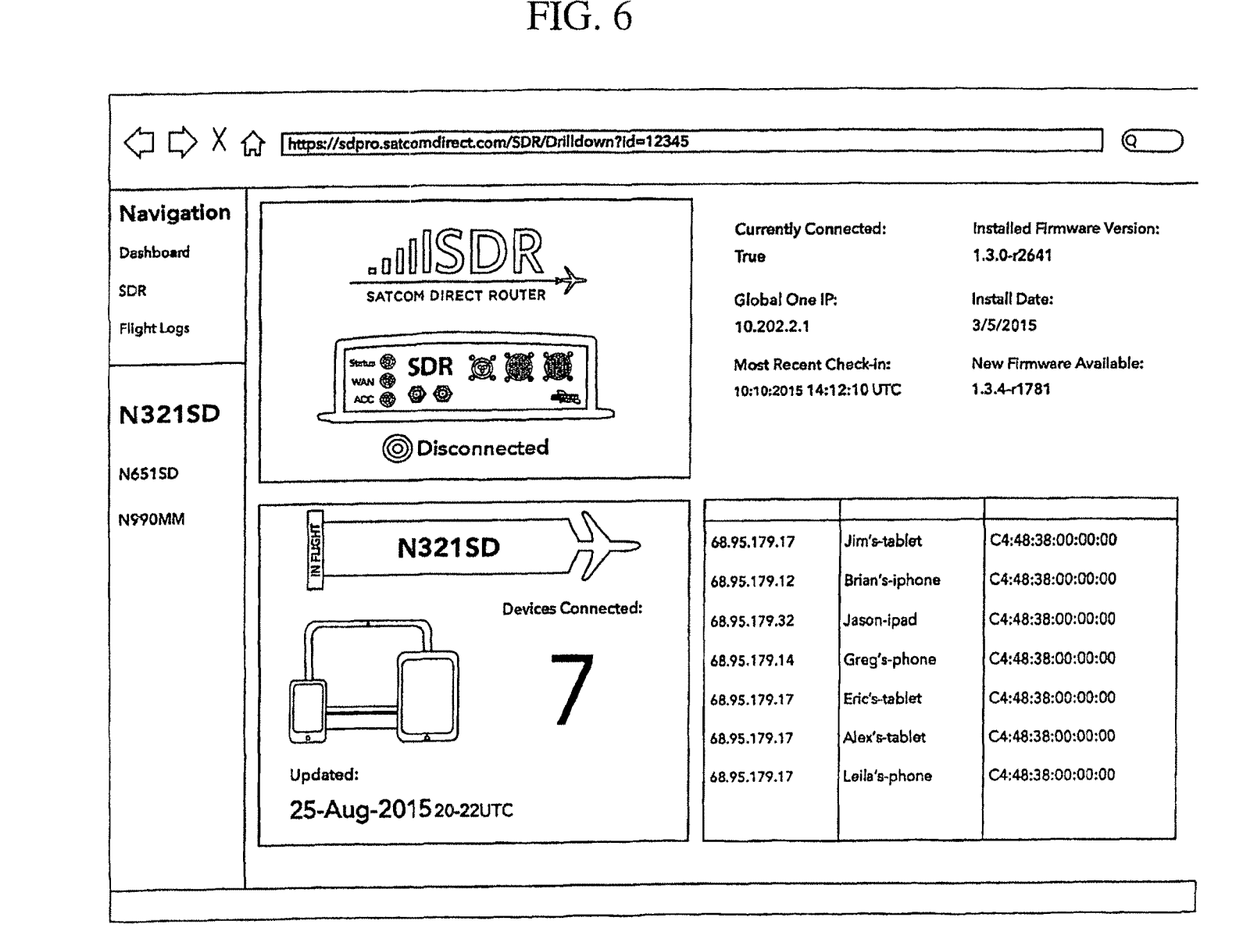
FIG. 6 is a screen shot showing router data from the router module.

FIG. 6 is a screen shot showing router data from the router module.

The module gives the user a real life snapshot into the SATCOM DIRECT® Router (SDR). The SDR is a router on board the aircraft that communicates with the sitcom system. The SDR is providing the gateway to all devices on the aircraft but also providing information to SATCOM DIRECT® on the ground. From the ground we are able to monitor the connected sitcom systems and devices, showing us which devices use the most data. From within the invention system, the user will also be able to shut down devices to free up the bandwidth for higher priority devices/people. The novel system is able to monitor what firmware is on the router and see the configuration details, all from the ground.

The invention can utilize the SDR (SATCOM DIRECT® Router) to be the WIFI AP. The SDR can include the invention described in U.S. patent application Ser. No. 14/259,588 filed Apr. 23, 2014, now U.S. Pat. No. 9,553,658, which claims the benefit of priority to U.S. Provisional Patent Application Ser. No. 61/892,672 filed Oct. 18, 2013 and U.S. Provisional Patent Application Ser. No. 61/888,574 filed Oct. 9, 2013 and U.S. Provisional Patent Application Ser. No. 61/888,593 filed Oct. 9, 2013, and U.S. Provisional Patent Application Ser. No. 61/889,183 filed Oct. 10, 2013, all based to the same assignee as the subject patent application, which are all incorporated by reference in their entirety.

The invention can be updated to include other modules, such as but not limited to a schedule module, operations module, financial module, invoicing module, safety module and facility module.

The scheduling module can include the ability for users to manage all aspects of flight scheduling. Flight department personnel will use this module to schedule new flights or to review flight information from the past, present or future. Additionally, this module will grant schedulers the novel benefit of making more informed decisions by providing users with real time information regarding aircraft availability, current and projected maintenance items and pilot availability.

The Operations module is a high level summary of all of the flight department modules, in one snapshot. This module would be used for the Director of Aviation or other management-level employee responsible for flight operations, aircraft maintenance, etc. to get a quick snapshot of what maintenance is coming due for the aircraft as well as what operations are being planned.

The Financial Module can include information that is specific to the aircraft the flight department operates. Each aircraft has a market value and book value for the asset. The Financial module will give a projection over time what the value is of their current aircraft subject to variables that are happening with the aircraft such as utilization as well as outside market conditions for resale. Embodiments may include information relevant for tax analysis related to the particular passengers or aircraft uses on any particular flight.

The invoicing module can include the ability for the user to review and/or pay their Satcom Direct invoice. Additionally, users can review their historic invoices through this module.

The safety module can include reports, reminders and compliance tracking for internal and external audits related to the operational safety of a flight department.

The facility module can include reports, reminders and compliance tracking for internal and external audits related to flight facilities and their operation.

The novel systems and methods allow for keeping the flight department of an aircraft in sync with aircraft, and is adaptive, customizable, and integrates with other platforms that can track aircraft status, flight logs, performance data, scheduling, trip planning and operating history. The systems and methods can access accurate integrated information for an entire flight operation via a single interface, all in real-time from a single login.

A single dashboard display can be used as a virtual whiteboard for a flight department and can be used in an easy to use click, drag and drop format on a desktop computer, and/or a portable device, such as a smart phone, or portable computer. The system and method can be grow to include more modules as needed.

Figure 7:
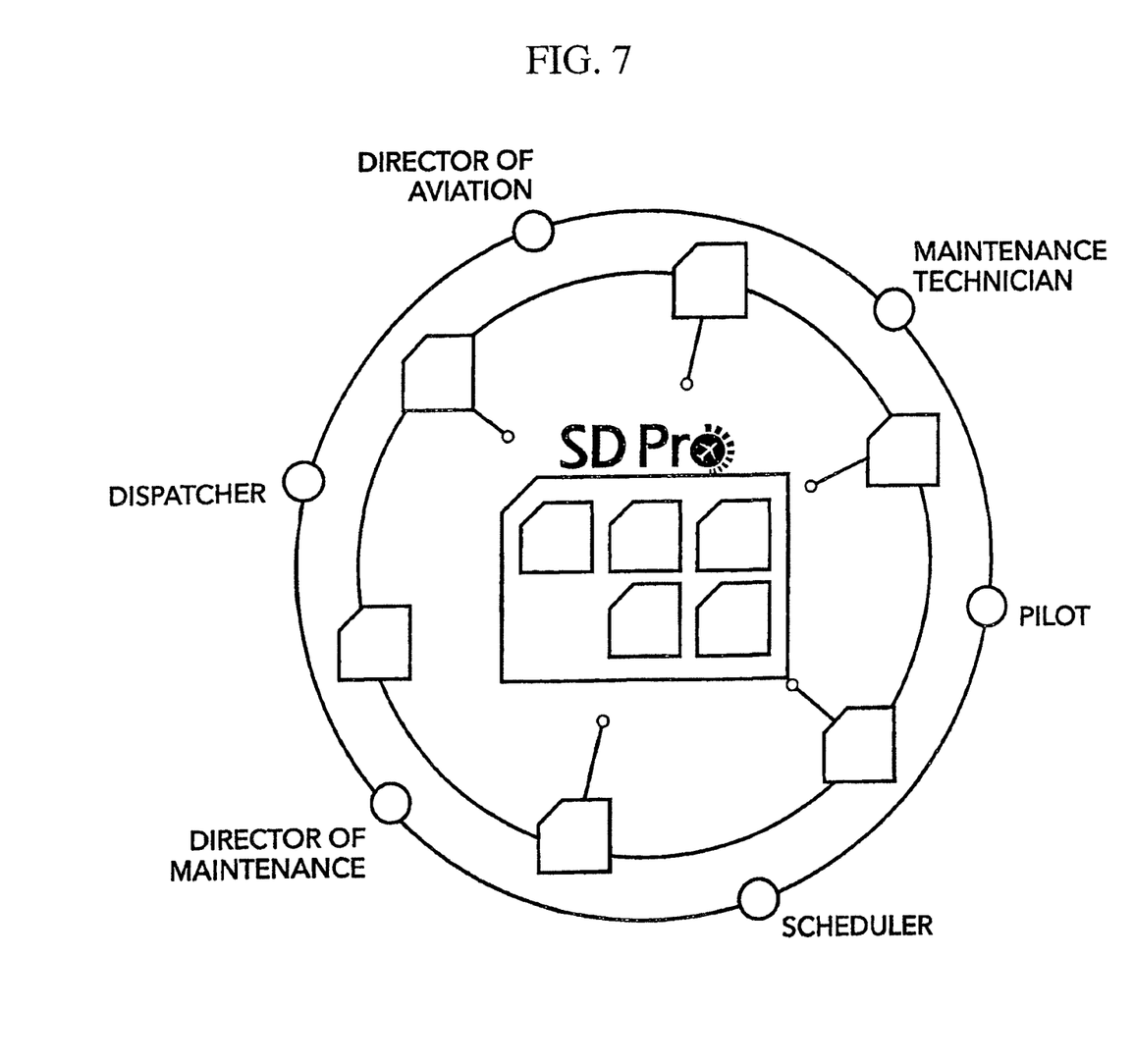
FIG. 7 shows a schematic a single dashboard of aircraft flight operations modules accessible by an aircraft flight department.

FIG. 7 shows a schematic a single dashboard of aircraft flight operations modules accessible by an aircraft flight department that can include but is not limited to a dispatcher, a director of maintenance, a scheduler, a pilot, a maintenance technician and a director of aviation.

A dashboard can include the following modules:

Flightlog module that auto-captures flight data and cycle events in real-time, reducing manual user input, and provides visibility of flight log information to the entire flight operation. Scheduler viewer module which provides trip information including trip legs and maintenance scheduled events, calendar and crew info, and integrates with scheduling partners PFM and aircraft logs. Flight tracker module which provides real-time flight tracking that includes departures, destinations, ETA, altitude and speed information, with at a glance status view which shows weather overlays including NEXRAD and worldwide satellite imagery. Maintenance viewer module which includes a performance feed from maintenance providers and includes engine hours, cycles, and times, and integrates with maintenance partners. Connectivity module which displays devices connected along with connectivity status of datalink, internet, SDR (SATCOM DIRECT ROUTER), voice, GLOBAL ONE IPTM, AEROXR AEROXR® and GLOBAL ONE NUMBER®, plus alerts of outages, and can track voice and data usage by month, flight and duration. Trip planning module which connects to universal weather and aviation trip planning and trip support services via a web-based version of uvGO. SDR Router module, which shows status of the onboard SATCOM DIRECT ROUTER including available networks and connection status as it automatically switches between providers, and tracks device connectivity and usage, also available via the SDR mobile application.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An integrated flight operations management platform system comprising:
   an interface for accessing a web portal site;
   a plurality of modules solely for flight operations of a single aircraft, wherein the plurality of modules includes a router module for recording data from different systems between the devices and an onboard router in the single aircraft and a ground system;
   a single display dashboard for displaying the plurality of modules for flight operations of the single aircraft in real time in response to the accessed web portal;
   the single display comprising a plurality of display portions, wherein each module is displayed within a separate display portion on the single display, each of the separate display portions comprising information from a single module, wherein at least one of said plurality of display portions comprises information from a connectivity module for recording connectivity data and usage data of devices on the single aircraft in real time, the connectivity module displays which devices are connected along with connectivity status in real time; and
   a control for selecting an individual module from the plurality of modules so that the individual module is displayed on the single display dashboard.

2. The system of claim 1 wherein the plurality of modules further comprises:
   a flight log module for recording flight log data of the single aircraft;
   a flight scheduling module for viewing and establishing a flight schedule of the single aircraft or a fleet of aircraft;
   a flight tracker module for recording flight tracker data of the single aircraft or fleet of aircraft; and
   a maintenance module for recording maintenance data of the single aircraft.

3. The system of claim 2 wherein the flight log data includes take off and landing time data of the single aircraft.

4. The system of claim 2 wherein the flight tracker data includes location data of the single aircraft in real time.

5. The system of claim 2 wherein the maintenance data includes maintenance records of the single aircraft.

6. The system of claim 2 wherein the connectivity status includes real time connectivity status of datalink, internet, router, and voice links.

7. The system of claim 2 wherein all data from the flight log module, the flight tracker module, the maintenance module, the connectivity module and the router module related to the single aircraft are displayed on the single display dashboard in real-time.

8. The system of claim 1 wherein the data includes aircraft-specific data and personnel-specific data for the single aircraft.

9. The system of claim 8 wherein the aircraft-specific data includes one or more selected from a group consisting of engine data, out of gate data, take-off data, landing data and into gate data.

10. The system of claim 8 wherein the personnel-specific data includes one or more selected from a group consisting of crew scheduling and passenger manifests.

11. The system of claim 1 wherein the router module includes communication between the onboard router of the single aircraft with the single display dashboard, and the router module monitors the connected devices on the single aircraft and provides for shutting down selected devices on the single aircraft to free up bandwidth for at least one of higher priority devices and higher priority users, all from the ground system.

12. A method of accessing flight operations of a single aircraft, comprising:
   providing a single interface to access a web portal;
   providing a plurality of modules solely for flight operations of a single aircraft, wherein the plurality of modules includes a router module for recording data from different systems between the devices and an onboard router in the single aircraft and a ground system;
   displaying the plurality of modules for flight operations of the single aircraft in real time on a single display dashboard in response to the accessed the web portal;
   the single display comprising a plurality of display portions, wherein each module is displayed within a separate display portion on the single display, each of the separate display portions comprising information from a single module, wherein at least one of said plurality of display portions comprises information from a connectivity module for recording connectivity data and usage data of devices on the single aircraft in real time, the connectivity module displays which devices are connected along with connectivity status in real time; and
   selecting an individual module from the plurality of modules so that the individual module is displayed on the single display dashboard.

13. The method of claim 12 wherein said providing a single interface comprises accessing the web portal through one or more devices selected from a group consisting of a desktop computer, a smart phone, and a portable computer.

14. The method of claim 12 wherein said providing a plurality of modules further comprises:
   providing a flight log module for recording the flight log data of the single aircraft; providing a flight scheduling module for viewing and establishing a flight schedule of the single aircraft or a fleet of aircraft;
   providing a flight tracker module for recording flight tracker data of the single aircraft or fleet of aircraft;
   providing a maintenance module for recording maintenance data of the single aircraft; and
   displaying data from the flight log module, the flight tracker module, the maintenance module, the connectivity module, and the router module on the single display dashboard in real-time.

15. The method of claim 14, wherein the flight log data includes take off and landing time data of the single aircraft.

16. The method of claim 14 wherein the flight tracker data includes location data of the single aircraft in real time.

17. The method of claim 14 wherein the maintenance data includes maintenance records of the single aircraft.

18. The method of claim 14 wherein said providing the connectivity module comprises providing real time connectivity status of datalink, internet, router, and voice links.

19. The method of claim 12 wherein the router module includes communication between the onboard router of the single aircraft with the single display dashboard, and the router module monitors the connected devices on the single aircraft and provides for shutting down selected devices on the single aircraft to free up bandwidth for at least one of higher priority devices and higher priority users, all from the ground system.

* * * * *